(12) United States Patent
Perrin Guerin et al.

(10) Patent No.: US 11,186,886 B2
(45) Date of Patent: *Nov. 30, 2021

(54) STEEL, PRODUCT MADE OF SAID STEEL, AND MANUFACTURING METHOD THEREOF

(71) Applicant: APERAM, Luxembourg (LU)

(72) Inventors: Valerie Perrin Guerin, Imphy (FR); Gilles Pinton, Imphy (FR); Angeline Bordas, Imphy (FR); Christian Vallade, Imphy (FR)

(73) Assignee: APERAM, Luxembourg (LU)

( * ) Notice: Subject to any disclaimer, the term of this patent is extended or adjusted under 35 U.S.C. 154(b) by 18 days.

This patent is subject to a terminal disclaimer.

(21) Appl. No.: 15/567,688

(22) PCT Filed: Apr. 25, 2016

(86) PCT No.: PCT/IB2016/052331
§ 371 (c)(1),
(2) Date: Oct. 19, 2017

(87) PCT Pub. No.: WO2016/170519
PCT Pub. Date: Oct. 27, 2016

(65) Prior Publication Data
US 2018/0087123 A1    Mar. 29, 2018

(30) Foreign Application Priority Data

Apr. 23, 2015    (WO) ............... PCT/IB2015/052975

(51) Int. Cl.
| | | |
|---|---|---|
| *C21D 9/00* | (2006.01) |
| *C22C 38/14* | (2006.01) |
| *C22C 38/12* | (2006.01) |
| *C22C 38/10* | (2006.01) |
| *C22C 38/08* | (2006.01) |
| *C22C 38/06* | (2006.01) |
| *C22C 38/04* | (2006.01) |
| *C22C 38/02* | (2006.01) |
| *C22C 38/00* | (2006.01) |
| *C21D 9/46* | (2006.01) |

(Continued)

(52) U.S. Cl.
CPC ........... *C21D 9/0068* (2013.01); *C21D 6/001* (2013.01); *C21D 6/005* (2013.01); *C21D 6/007* (2013.01); *C21D 6/008* (2013.01); *C21D 6/02* (2013.01); *C21D 7/06* (2013.01); *C21D 8/005* (2013.01); *C21D 8/021* (2013.01); *C21D 8/0205* (2013.01); *C21D 8/0226* (2013.01); *C21D 8/0236* (2013.01); *C21D 8/0247* (2013.01); *C21D 8/0278* (2013.01); *C21D 9/00* (2013.01); *C21D 9/30* (2013.01); *C21D 9/46* (2013.01); *C22B 9/18* (2013.01); *C22B 9/20* (2013.01); *C22C 1/02* (2013.01); *C22C 30/00* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/08* (2013.01); *C22C 38/105* (2013.01); *C22C 38/12* (2013.01); *C22C 38/14* (2013.01); *C22C 38/16* (2013.01); *C22C 38/18* (2013.01); *C22C 38/42* (2013.01); *C22C 38/44* (2013.01); *C22C 38/50* (2013.01); *C22C 38/52* (2013.01); *C22C 38/54* (2013.01); *C21D 2211/004* (2013.01); *C21D 2211/008* (2013.01); *F16C 3/02* (2013.01)

(58) Field of Classification Search
CPC .. C21D 8/12; C21D 9/46; C22C 38/00; C22C 38/001; C22C 38/008; C22C 38/02; C22C 38/04; C22C 38/06; C22C 38/34; C22C 38/60; C23C 22/00; G01N 21/57; H01F 1/147; H01F 1/14775
See application file for complete search history.

(56) References Cited

U.S. PATENT DOCUMENTS

| | | | |
|---|---|---|---|
| 6,663,730 B2 | 12/2003 | Coutu | |
| 2002/0059967 A1* | 5/2002 | Coutu | ............... C21D 6/02 148/336 |
| 2010/0189590 A1 | 7/2010 | Ohishi et al. | |

FOREIGN PATENT DOCUMENTS

| | | |
|---|---|---|
| CN | 1630732 | 6/2005 |
| CN | 101688271 | 3/2010 |

(Continued)

OTHER PUBLICATIONS

International Search Report, dated Sep. 29, 2016, from corresponding PCT/IB2016/052331 application.
International Search Report, dated Feb. 1, 2016, from corresponding PCT/IB2015/052975 application.

*Primary Examiner* — Jenny R Wu
(74) *Attorney, Agent, or Firm* — Nixon & Vanderhye

(57) ABSTRACT

Disclosed is a steel composition including specified ranges of Ni; Mo; Co; Mo+Co+Si+Mn+Cu+W+V+Nb+Zr+Ta+Cr+C; Co+Mo; Ni+Co+Mo; and traces of Al; Ti; N; Si; Mn; C; S; P; B; H; O; Cr; Cu; W; Zr; Ca; Mg; Nb; V; and Ta in specified ranges; the remainder being iron and impurities. The inclusion population, as observed by image analysis over a polished surface measuring 650 mm² if hot-formed or hot-rolled; and measuring 800 mm² if cold-rolled, does not contain non-metallic inclusions of diameter>10 µm, and, in the case of a hot-rolled sheet, does not contain more than four non-metallic inclusions of diameter 5-10 µm over 100 mm², the observation being performed by image analysis over a polished surface measuring 650 mm².

38 Claims, 3 Drawing Sheets

Figure 1:
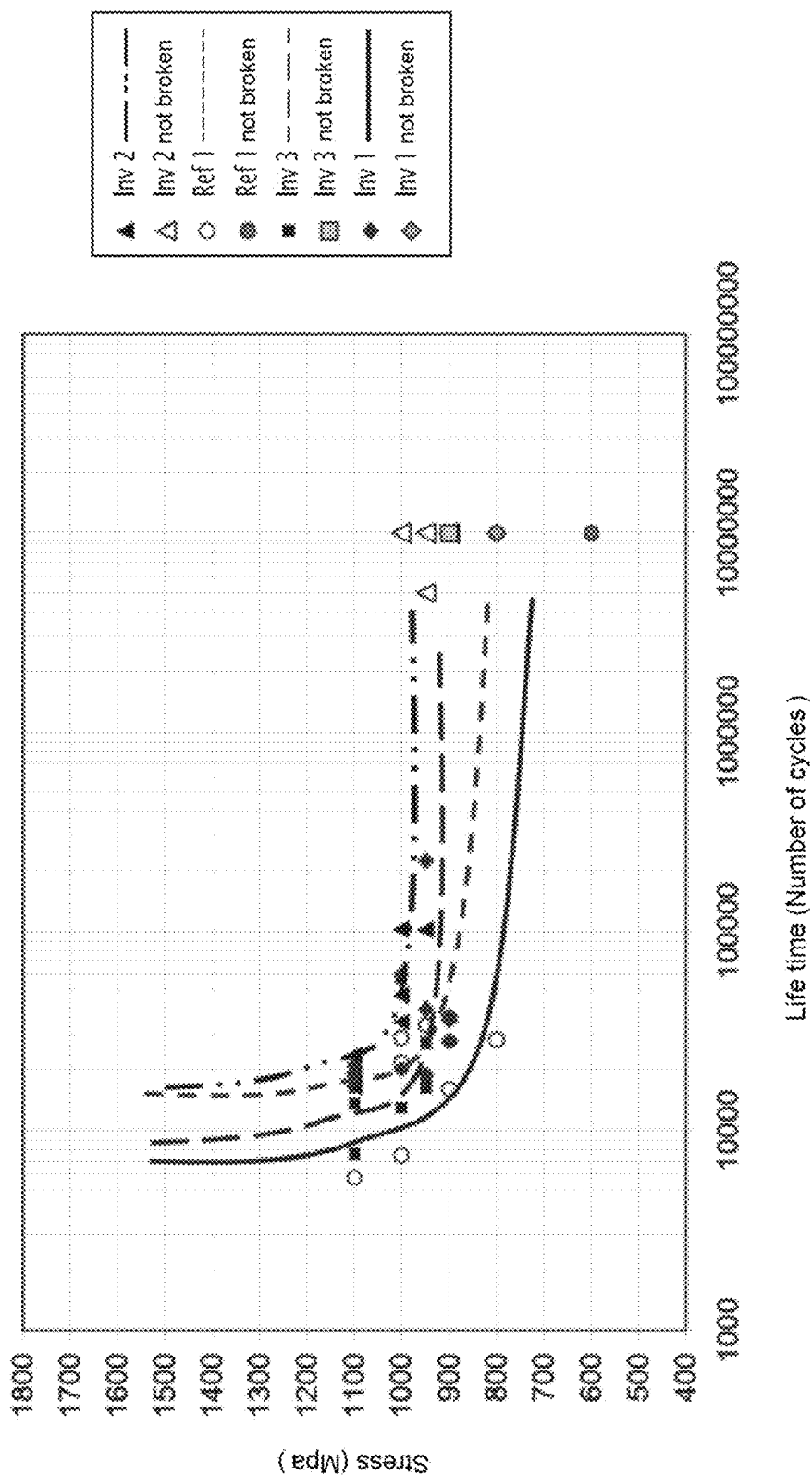

(51) Int. Cl.
*C21D 8/02* (2006.01)
*C21D 6/00* (2006.01)
*C21D 6/02* (2006.01)
*C21D 8/00* (2006.01)
*C22C 38/54* (2006.01)
*C22C 38/44* (2006.01)
*C22C 38/18* (2006.01)
*C22B 9/18* (2006.01)
*C22B 9/20* (2006.01)
*C21D 7/06* (2006.01)
*C22C 38/52* (2006.01)
*C22C 38/16* (2006.01)
*C22C 38/50* (2006.01)
*C22C 1/02* (2006.01)
*C21D 9/30* (2006.01)
*C22C 30/00* (2006.01)
*C22C 38/42* (2006.01)
*F16C 3/02* (2006.01)

(56) References Cited

FOREIGN PATENT DOCUMENTS

| | | | |
|---|---|---|---|
| EP | 2180073 A1 * | 4/2010 | ........... C22C 38/001 |
| EP | 2 180 073 B1 | 9/2013 | |
| JP | S52 14518 A | 2/1977 | |
| JP | 2003-183765 A | 7/2003 | |
| JP | 2004-514056 A | 5/2004 | |
| JP | 2004-238718 A | 8/2004 | |
| JP | 2005-232551 A | 9/2005 | |
| JP | 2007 186780 A | 7/2007 | |
| JP | 2008 088540 A | 4/2008 | |
| JP | 2008088540 A * | 4/2008 | |
| JP | 2009-013464 A | 1/2009 | |
| WO | 02/40722 A1 | 5/2002 | |
| WO | 2009/008071 A1 | 1/2009 | |

* cited by examiner

STEEL, PRODUCT MADE OF SAID STEEL, AND MANUFACTURING METHOD THEREOF

The invention relates to the field of steels referred to as "maraging steels", used in particular for applications requiring one or more of the following properties: excellent mechanical properties (very good fatigue resistance, high yield strength, and high resistance to breakage), simplicity of heat treatment and dimensional stability, ease of welding (good weldability) and good formability.

These maraging steels are characterised by a martensite structure, which can be aged, in a manner such as to obtain, upon completion of a steel aging process, a hardening by precipitation of intermetallic phases that are favourable for obtaining high mechanical properties.

Maraging steels that have conventionally been known include such types as M 250, having typical composition (expressed in weight percentages, as will be the case with all of the compositions provided in the following sections) Ni=18%, Co=9%, Ti=0.45% (grade referred to as X2NiCoMo18-9-5), with the remainder generally being iron and impurities resulting from the smelting and manufacturing process. They are used for manufacturing, in particular, parts with high mechanical properties, that are suitable for use both as large or solid parts (shafts for motors, centrifuge blades, etc) as well as high performance precision parts: springs for watches, blades for foils, elements for automatic transmission belts of CVT (Continuous Variable Transmission) type, in particular, for automobiles or for vehicles in general, or machine tools and other rotating machinery, etc. In the case of thin gauge applications where the part is subjected fatigue stresses, it is common practice to carry out, in addition to aging, a surface treatment process of hardening of the part by nitriding, carbonitriding, shot peening, cementation (carburising), etc.

Also known from the document EP-B1-1339880, are maraging steels whereof the composition is follows: Ni=12 to 24.5%; Mo=2.5%; Co=4.17%; Al≤0.15%; Ti≤0.1%; N≤30 ppm; Si≤0.1%; Mn≤0.1%; C≤50 ppm; S≤10 ppm; P≤50 ppm; H≤3 ppm; O≤10 ppm; the remainder being Fe and impurities resulting from the smelting and manufacturing process, with Ni+Mo comprised between 20% and 27%; Co %×Mo % comprised between 50 and 200; Ti %×N %≤2.10$^{-4}$, which are produced by means of methods including various types of vacuum remelting treatment processes such as VIM (Vacuum Induction Melting) and/or VAR (Vacuum Argon Remelting), possibly coupled with a treatment process by remelting in electroconductive slag ESR (Electro Slag Remelting). These steels are subsequently transformed through hot and cold processes in order to obtain strips of fine thickness (1 mm or less for example). After the part has been subjected to forming, a treatment process of precipitation hardening is carried out that confers to the part its core mechanical properties; a subsequent surface treatment could confer to the treated piece enhanced surface properties in respect of fatigue stressing, static friction, dynamic friction, etc.

As compared to previously known maraging steels containing approximately 18% of Ni, 9% of Co, 5% of Mo, 0.5% of Ti, and a small quantity of Al, these steels indicated in the document EP-B1-1339880 are differentiated therefrom by virtue of their greater fatigue resistance, associated with a controlled inclusion cleanliness (inclusion content) and higher mechanical strength, greater than 2000 megapascal MPa (in the aged state). In more detailed terms: the mechanical properties targeted in respect of cold-rolled products are Ar>2.5% $Rp_{0.2}$<1140 MPa, Rm<1480 MPa; in the aged state, $Rp_{0.2}$>1770 MPa, Rm>1800 MPa; finally in the nitrided state the properties targeted are Ar>1%; Rm>1930 MPa.

Also known from the document EP-B1-2180073 are maraging steels with high fatigue strength and high tensile strength for use in CVT belts, with the following composition: C≤100 ppm; Si≤0.1%; Mn≤0.1%; P≤0.01%; S≤50 ppm; Ni=17-22%; Cr=0.1-4.0%; Mo=3.0-7.0%; Co=10.0-20.0%; Ti≤0.1%; Al≤O, 05%; N≤300 ppm; O≤50 ppm; 0<B≤0.01%; an optional presence of up to 0.01% Ca, up to 0.005% Mg, up to 0.01% Zr, the remainder being Fe and impurities, with Co/3+Mo+4Al comprised between 8.0% and 15.0%. Preferably the thermal and thermomechanical treatment processes to which they are subjected confer to them a very fine grain size, measuring ASTM 10 or greater.

The object of the invention is to provide a new type of maraging steel which in particular, presents better mechanical properties than those that have been described here above. This new type of steel would have optimised properties that are suitable for various applications. An enhanced level of tensile strength and/or fatigue resistance would be the advantageous properties deemed to be desirable, along with the ability to form, during a surface treatment process, a nitrided layer, carbonitrided layer, cemented layer, sand blasted layer or other case hardened type layer that is capable of introducing at the surface residual stresses that allow for retarding the cracking under cyclic loading which would be due to the placing under compression of the surface layers. The effect of surface treatments may also be evaluated through the hardness conferred to the product surface.

To this end, the object of the invention relates to a type of steel, wherein its composition, in percentages by weight is as follows:

10.0%≤Ni≤24.5%, preferably 12.0%≤Ni≤24.5%;
1.0%≤Mo≤12.0%, preferably 2.5%≤Mo≤9.0%;
1.0%≤Co≤25.0%;
20.0%≤Mo+Co+Si+Mn+Cu+W+V+Nb+Zr+Ta+Cr+C≤29.0%, preferably 22.0%≤Mo+Co+Si+Mn+Cu+W+V+Nb+Zr+Ta+Cr+C≤29.0%, more preferably 22.5%≤Mo+Co+Si+Mn+Cu+W+V+Nb+Zr+Ta+Cr+C≤29.0%;
Co+Mo≥20.0%; preferably Co+Mo≥21.0%; more preferably Co+Mo≥22.0%;
Ni+Co+Mo≥29%; preferably Ni+Co+Mo≥41.0%;
traces≤Al≤4.0%, preferably 0.01%≤Al≤1.0%;
traces≤Ti≤0.1%;
traces≤N≤0.0050%;
traces≤Si≤2.0%; preferably 0.04%≤Si≤2.0%;
traces≤Mn≤4.0%;
traces≤C≤0.03%;
traces≤S≤0.0020%, preferably traces≤S≤0.0010%;
traces≤P≤0.005%;
traces≤B≤0.01%;
traces≤H≤0.0005%;
traces≤O≤0.0025%;
traces≤Cr≤5.0%;
traces≤Cu≤2.0%;
traces≤W≤4.0%;
traces≤Zr≤4.0%;
traces≤Ca≤0.1%;
traces≤Mg≤0.1%;
traces≤Nb≤4.0%;
traces≤V≤4.0%;
traces≤Ta≤4.0%;

with the remainder being iron and impurities resulting from the smelting and manufacturing process;

and in that the inclusion population, as observed by means of image analysis over a polished surface measuring 650 mm² if the steel is in the form of a component part/work piece that is hot-formed or a hot-rolled sheet; and measuring 800 mm² if the steel is in the form of a cold-rolled sheet, does not contain non-metallic inclusions having equivalent diameter greater than 10 μm, preferably does not contain non-metallic inclusions having equivalent diameter greater than 8 μm, and, in the case of a hot-rolled sheet, does not contain more than four non-metallic inclusions having equivalent diameter of 5 μm to 10 μm over 100 mm², the observation being performed by means of image analysis over a polished surface measuring 650 mm².

Preferably, 18.0%≤Ni+Mo≤27.0%.

Cr may be present only in trace amounts resulting from the smelting and manufacturing process.

In other words, traces≤Cr<0.10%.

The object of the invention also relates to a manufacturing method for the manufacture of a product made of steel, wherein:
- a remelting electrode is prepared being made from a steel whose composition is in conformity with that which has been discussed here above;
- the remelting of this electrode is performed by means of a single or multiple remelting process in order to obtain a remelted electrode;
- at least one process of hot forming of the remelted electrode is carried out, at a temperature comprised between 1050° C. and 1300° C., in order to obtain a hot-formed sheet or a hot-formed strip;
- and optionally a heat treatment process is carried out on the said hot-formed sheet or the said hot-formed strip.

The said hot-formed sheet or strip, possibly heat treated, may have a tensile strength that is greater than or equal to 1010 MPa, a Young's modulus greater than or equal to 130 GPa, and a uniform elongation greater than or equal to 2%.

The said sheet that is hot-formed or the said strip that is hot-formed and possibly heat-treated may subsequently be cold-rolled in one or more passes in order to obtain a sheet or a strip having a thickness that is less than or equal to 2 mm, preferably less than or equal to 1 mm.

The sheet or strip may be subjected to at least one heat treatment process between cold rolling passes and/or after the last cold rolling pass.

The cumulative rate of cold rolling of the various passes may be at least 30%, preferably at least 40%.

The said sheet or strip that is hot-rolled or cold-rolled and possibly heat-treated may have a tensile strength that is greater than or equal to 2270 MPa, a yield strength greater than or equal to 2250 MPa, and a uniform elongation greater than or equal to 2%.

The said sheet or strip that is hot-rolled or cold-rolled and possibly heat-treated may be cut, and subsequently possibly subjected to forming.

The said sheet or strip that is hot-rolled or cold-rolled and possibly heat-treated, cut and, possibly, subjected to forming, may be subjected to a hardening treatment between 420° C. and 550° C. for a period of 30 min to 2 hrs, preferably at 450° C. to 550° C. for a period of 1 hr to 2 hrs.

The said sheet or strip that is hot-rolled or cold-rolled, and possibly heat-treated, cut and, possibly, subjected to forming, may be subjected, after its hardening, to a surface treatment process for improving its resistance to dynamic loads.

The said surface treatment may be a process of carburising, or gas nitriding, or ion nitriding, or carbonitriding, or shot peening.

The grain size of the hot-rolled sheet or strip that is possibly heat-treated, or of the cold-rolled sheet or strip that is possibly heat-treated, may be 8 ASTM or finer, preferably 10 ASTM or finer.

The object of the invention also relates to a product made of steel that has been subjected to a heat forming process and that has possibly been heat-treated, wherein the composition thereof, in percentages by weight is as follows:
- 10.0%≤Ni≤24.5%, preferably 12.0%≤Ni≤24.5%;
- 1.0%≤Mo≤12.0%, preferably 2.5%≤Mo≤9.0%;
- 1.0%≤Co≤25.0%;
- 20.0%≤Mo+Co+Si+Mn+Cu+W+V+Nb+Zr+Ta+Cr+C≤29.0%, preferably 22.0%≤Mo+Co+Si+Mn+Cu+W+V+Nb+Zr+Ta+Cr+C≤29.0%, more preferably 22.5%≤Mo+Co+Si+Mn+Cu+W+V+Nb+Zr+Ta+Cr+C≤29.0%;
- Co+Mo≥20.0%; preferably Co+Mo≥21.0%; more preferably Co+Mo≥22.0%;
- Ni+Co+Mo≥29%; preferably Ni+Co+Mo≥41.0%;
- traces≤Al≤4.0%, preferably 0.01%≤Al≤1.0%;
- traces≤Ti≤0.1%;
- traces≤N≤0.0050%;
- traces≤Si≤2.0%; preferably 0.04%≤Si≤2.0%;
- traces≤Mn≤4.0%;
- traces≤C≤0.03%;
- traces≤S≤0.0020%, preferably traces≤S≤0.0010%;
- traces≤P≤0.005%;
- traces≤B≤0.01%;
- traces≤H≤0.0005%;
- traces≤O≤0.0025%;
- traces≤Cr≤5.0%;
- traces≤Cu≤2.0%;
- traces≤W≤4.0%;
- traces≤Zr≤4.0%;
- traces≤Ca≤0.1%;
- traces≤Mg≤0.1%;
- traces≤Nb≤4.0%;
- traces≤V≤4.0%;
- traces≤Ta≤4.0%;

with the remainder being iron and impurities resulting from the smelting and manufacturing process;

and in that the inclusion population, as observed by means of image analysis over a polished surface measuring 650 mm² if the steel is in the form of a component part/work piece that is hot-formed or a hot-rolled sheet, does not contain non-metallic inclusions having equivalent diameter greater than 10 μm, preferably does not contain non-metallic inclusions having equivalent diameter greater than 8 μm, and, in the case of a hot-rolled sheet, does not contain more than four non-metallic inclusions having equivalent diameter of 5 μm to 10 μm over 100 mm², the observation being performed by means of image analysis over a polished surface measuring 650 mm².

Preferably, 18.0%≤Ni+Mo≤27.0%.

Cr may be present only in trace amounts resulting from the smelting and manufacturing process.

In other words, traces≤Cr<0.10%.

This product may have a tensile strength that is greater than or equal to 1010 MPa, a Young's modulus greater than or equal to 130 GPa, and a uniform elongation greater than or equal to 2%.

The object of the invention also relates to a cold-rolled sheet or strip, made from steel, wherein the composition thereof, in percentages by weight is as follows:

10.0%≤Ni≤24.5%, preferably 12.0%≤Ni≤24.5%;
1.0%≤Mo≤12.0%, preferably 2.5%≤Mo≤9.0%;
1.0%≤Co≤25.0%;
20.0%≤Mo+Co+Si+Mn+Cu+W+V+Nb+Zr+Ta+Cr+C≤29.0%, preferably 22.0%≤Mo+Co+Si+Mn+Cu+W+V+Nb+Zr+Ta+Cr+C≤29.0%, more preferably 22.5%≤Mo+Co+Si+Mn+Cu+W+V+Nb+Zr+Ta+Cr+C≤29.0%;
Co+Mo≥20.0%; preferably Co+Mo≥21.0%; more preferably Co+Mo≥22.0%;
Ni+Co+Mo≥29%; preferably Ni+Co+Mo≥41.0%;
traces≤Al≤4.0%, preferably 0.01%≤Al≤1.0%;
traces≤Ti≤0.1%;
traces≤N≤0.0050%;
traces≤Si≤2.0%; preferably 0.04%≤Si≤2.0%;
traces≤Mn≤4.0%;
traces≤C≤0.03%;
traces≤S≤0.0020%, preferably traces≤S≤0.0010%;
traces≤P≤0.005%;
traces≤B≤0.01%;
traces≤H≤0.0005%;
traces≤O≤0.0025%;
traces≤Cr≤5.0%;
traces≤Cu≤2.0%;
traces≤W≤4.0%;
traces≤Zr≤4.0%;
traces≤Ca≤0.1%;
traces≤Mg≤0.1%;
traces≤Nb≤4.0%;
traces≤V≤4.0%;
traces≤Ta≤4.0%;
with the remainder being iron and impurities resulting from the smelting and manufacturing process;
and in that the inclusion population, as observed by means of image analysis over a polished surface measuring 800 mm$^2$, does not contain non-metallic inclusions having equivalent diameter greater than 10 μm, preferably does not contain non-metallic inclusions having equivalent diameter greater than 8 μm.

Preferably, 18.0%≤Ni+Mo≥27.0%.

Cr is present only in trace amounts resulting from the smelting and manufacturing process.

In other words, traces≤Cr<0.10%.

The cold-rolled sheet or strip may have been subjected to at least one heat treatment process after cold rolling.

The object of the invention also relates to a hot-rolled or cold-rolled sheet or strip of the foregoing types, wherein the said sheet or strip that has been cold-rolled and possibly heat-treated has a tensile strength that is greater than or equal to 2270 MPa, a yield strength greater than or equal to 2250 MPa, and a uniform elongation greater than or equal to 2%.

The object of the invention also relates to a product made of steel, wherein it is derived from a hot-rolled or cold-rolled sheet or strip of the foregoing type, possibly subjected to forming, and in that it has been possibly subjected to a surface treatment process for improving its resistance to dynamic loads.

The said surface treatment may be selected from among the processes of: carburising, gas nitriding, ion nitriding, carbonitriding, shot peening.

The object of the invention also relates to a turbine shaft or a transmission component part that is hot-formed, wherein the said shaft or the said component part comprises at least one element that is made from a hot-formed product of the foregoing type.

The object of the invention also relates to a transmission belt, wherein it comprises at least one element that is made from a cold-rolled sheet or strip or from a product of the foregoing type.

It may be a CVT-type transmission belt for a motor vehicle.

The object of the invention also relates to a product made of steel that has been subjected to a heat forming process and possibly having been heat-treated, of the above-mentioned type, or a sheet or strip that has been cold-rolled and possibly heat-treated of the above-mentioned type, wherein the grain size of the product or of the sheet or strip is ASTM 8 or finer, preferably ASTM 10 or finer.

As will have been understood, the invention consists in combining a determined maraging steel composition, that provides a so-called "soft" martensite due to the low carbon content of the steel, with a population of non-metallic inclusions (essentially oxides, sulfides, nitrides) satisfying specific criteria with respect to number and, preferably, to composition, it being possible to obtain this population after a careful preparation and processing of the liquid metal by making use of a combination of various production processes and conditions controlled by the operators.

Figure 2:
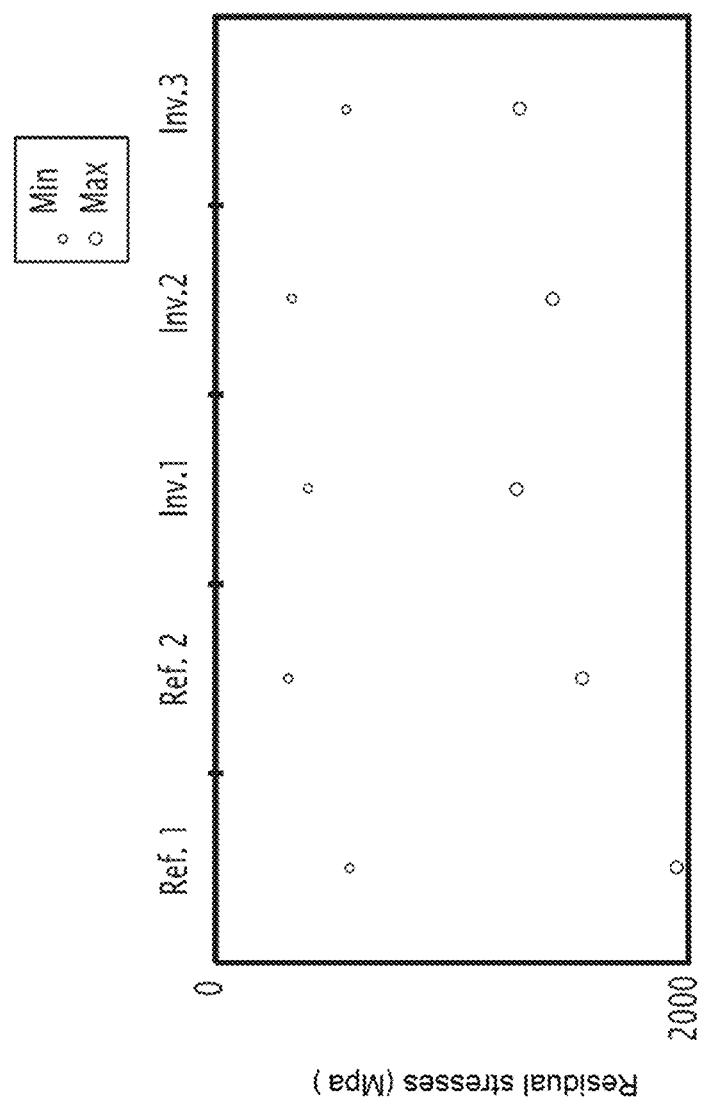
Figure 3:
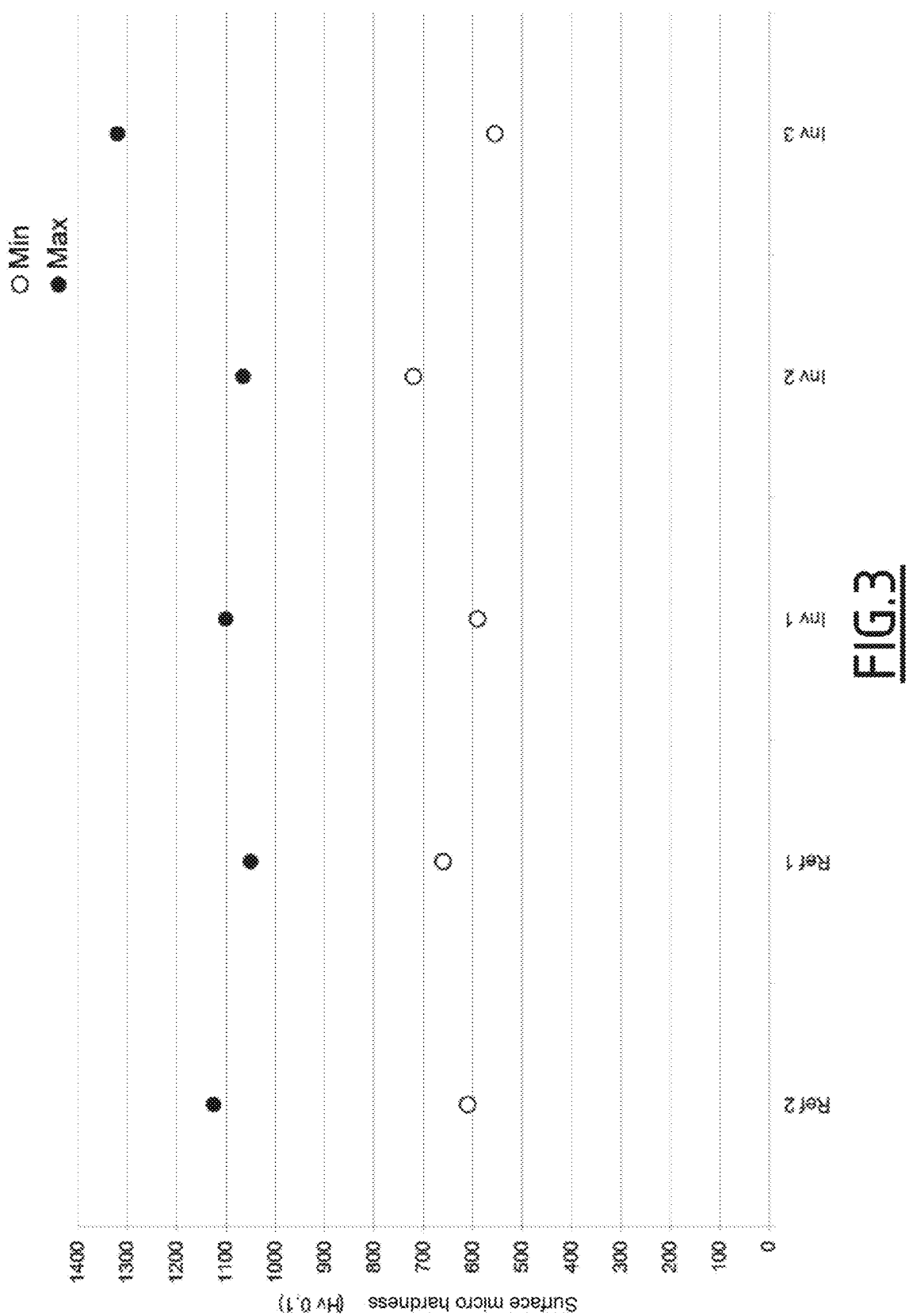

The invention will be better understood upon reading the description which follows, provided with reference being made to the following appended figures:

FIG. 1 which shows the results of fatigue tests carried out on a reference sample and on three samples of a steel according the invention;

FIG. 2 which shows a characterisation of the nitrided layers by their surface residual stresses, performed on two reference samples and on three samples of a steel according to the invention;

FIG. 3 which shows a characterisation of the nitrided layers by their levels of micro-hardness on the surface, performed on two reference samples and on three samples of a steel according to the invention.

The composition of the steel (in weight percentages) is based on the following considerations.

The Ni content is comprised between 10.0 and 24.5% preferably between 12.0 and 24.5%. It is under this condition that:
  on the one hand, it is possible to obtain by means of the usual heat treatment processes a martensitic structure; a Ni content of more than 24.5%, combined with the content levels of the other elements, would not provide the means to obtain such a structure;
  on the other hand, it is possible to obtain after the precipitation hardening, the properties of ductility, dilation, yield strength, fracture toughness K1C that are particularly favourable for the applications envisaged; a minimum Ni content of 10.0%, combined with the defined proportions of Co, Mo and other metallic elements, is suitable for obtaining this. A minimum Ni content of 12.0% is even more preferred in order to obtain this effect in a satisfactory manner.

The Mo content is comprised between 1.0 and 12.0%. This element makes possible the structural hardening by forming, during the aging process, intermetallic phases Fe$_2$Mo, MoNi$_3$ and others, that are fine and dispersed. Optimally, the Mo content is from 2.5 to 9.0% in order to obtain both a very significant effect of Mo and intermetallic phases having an optimal size so as to ensure the homogeneity of the mechanical properties.

Mo is also involved in the constitution and the properties of the nitrided layers which comprise fine and disperse precipitates of different kinds according to the conditions of the nitriding process (types of precipitates such as $Mo_2N$, $Fe_xMo_yN_z$, etc).

The content of Ni+Mo is to be adjusted according to the martensitic transformation temperature Ms (start of transformation), Mf (end of transformation) that are necessary to the obtaining and the maintaining of a martensitic structure and dimensional stability, taking into consideration the applications envisaged for future products and the use temperatures that they impose. For example, for an application at low temperatures of use, a temperature Ms is targeted that is higher than 100° C., and a sum of Ni+Mo of 18.0 to 27.0% is favourable from this point of view. The Ms values are calculated according to the formula:

$$Ms=-29Ni\ \%+Mo\ \%+890°\ C.,$$

for Co=9-16% and for the very low contents of Cr, Al and Ti, these elements having a marked influence on Ms, it being possible, in any case, for this temperature to be estimated through experimentation.

Mf may be easily deduced through experimentation.

The Co content is comprised between 1.0 and 25.0%. This element stabilises the martensite structure, raises the solidus temperature and participates in an indirect manner in the hardening by promoting the precipitation of the intermetallic phases. If too much thereof is put in, the properties of the steel and the conditions of its implementation may be modified significantly and the addition becomes costly.

If Co is relatively low, its action needs to be completed by the addition of one or more of the hardening elements Si, Mn, Cu, W, V, Nb, Zr, C.

The consequence of this requirement on the need to have sufficient amounts of Co is that the sum Mo+Co+Si+Mn+Cu+W+V+Nb+Zr+Ta+Cr+C is comprised between 20.0% and 29.0%. This implies that if the Co content is less than 8%, it would always be necessary to add at least one element selected from among Si, Mn, Cu, W, V, Nb, Zr, Ta, Cr, C (within the limits prescribed elsewhere), taking into account the fact that Mo is never greater than 12%.

The lower limit of 20.0% is justified by the ability to obtain a sufficient hardening effect. Beyond 29.0%, the magnetic properties and the conditions of application and use of the material come to be significantly modified. Preferably the lower limit is 22.0%, more preferably 22.5%, in order to obtain the maximal properties upon conclusion of the aging process and the use values required by the most demanding applications envisaged.

The contents of Ni, Co, Mo are also dependent on each other, in that:

Ni enhances the ductility (in particular at low temperatures), and supports the ability to control the expansion and the modulus of elasticity; it also has an effect on the toughness and the ratio Re/Rm; its contents are framed: at the lower bound in order to benefit from the favourable properties which have been cited (in general from 5% for alloys), and at the upper bound in order to not obstruct the martensitic transformation due to its gamma-phase (austenite) producing nature; to this end, the affects or influences of Co and Mo are also taken into account;

Mo is added for the purposes of structural hardening by precipitation of intermetallic phases; and, in order to target the fracture properties of maraging grades, it is necessary to have an aged martensitic structure; Mo is involved in this hardening as has been mentioned here above (from 1%); the limits thereof are only found in the formation of embrittling phases (Laves phases, $\sigma$, $\mu$, $\theta$, $\delta$ . . . ), which can be associated with local segregations the upper limit being 12%; Mo is also involved in the nitriding of surfaces by its affinity with nitrogen (from a few %). Thus in order to have an aging martensitic structure, the Co and Mo elements act jointly with respect to the precipitation of hardening phases, but in a dissociated manner with respect to the stabilisation of the ferritic structures; in order to unify these tendencies, a formula is provided so as to ensure a temperature Ms of more than 100° C., based on:

Co+Mo≥20.0%, preferably ≥21.0%, more preferably ≥22.0%;

and:

Ni+Co+Mo≥29%; preferably 41.0%.

The Al content is comprised between trace levels and 4.0%. it is not mandatory for Al to be added. It is possible to reduce its presence to the level of that of a residual element, resulting from the quantity that it was eventually necessary to add for the initial deoxidation of the liquid metal at the beginning of the production process, or to proceed with making an intentional addition of Al in order to obtain specific properties. For a moderate cost, it increases the resilience and can participate in the structural hardening by forming intermetallic compounds. Also, it limits the oxidation during the smelting and preparation process of the liquid metal and the transformations of the solidified metal. But it is necessary to prevent the forming of nitrides of Al and of large-sized oxides containing Al in order to not degrade the fatigue strength and toughness. Preferably there remains more than 0.01% and less than 1.0% Al in the final steel.

The Ti content is comprised between trace levels and 0.1%. By avoiding a significant presence of Ti (which other maraging steels require), it is intended to prevent the formation during the solidification of the liquid metal of Ti nitrides, which deteriorate the fatigue strength of the final product. In the invention, the desired structural hardening is obtained by other means.

The content of N is required at a low level, that is to say, not more than 0.0050% (50 ppm) in order to prevent the formation of nitrides as far as it is possible.

The Si content is comprised between trace levels and 2.0%, preferably between 0.04% and 2.0%. It may be used for deoxidation of the liquid metal during the preparation-production process, however it is necessary to be careful to avoid retaining large-sized oxides containing Si (like other deoxidizing elements) in the final solidified steel, hence the upper limit of 2.0%. Si stabilises the martensite, increases the solubility of certain elements and thus homogenises the structure. It also improves the yield strength.

The content of Mn, a non-mandatory element, is comprised between trace levels and 4.0%, or even between 0.2 and 4%. Mn improves the mechanical properties and the possibilities for hot work applications. Mn itself is also an effective deoxidizer, and can act in this respect in synergy with Si. However, it is necessary to limit its content to 4% in order to avoid forming large precipitates, brittle phases, or low-melting point phases. Finally, it is gamma-phase producing and may therefore hinder the martensitic transformation if it is present in excessive amounts.

The C content is comprised between trace levels and 0.03%. The idea is thus to form so-called soft martensite because the carbon martensite is brittle and is does not allow to enable the forming processes necessary to the product. It is also sought to avoid the formation of carbides which would degrade the mechanical properties.

The S content is comprised between trace levels and 0.0020%, preferably between trace levels and 0.0010%, in order to not form sulphides which would degrade the fatigue strength if they were present in large size and number. In addition, the S weakens the grain boundaries by segregating into them, hence the possible formation of cracks upon the steel being subjected to stresses. It is therefore necessary to prevent the presence of dissolved S, by way of a careful selection of raw materials and/or a deep desulfurisation process. The precise tolerable maximum content is to be adjusted depending on the applications intended, in a known manner (within the limit of 0.002% at most, as mentioned here above).

The P content is comprised between trace levels and 0.005%, preferably less, in order to limit the possibility of it segregating into the grain boundaries, as with S.

B may be present only in trace amounts, but an addition is preferred, up to 0.01%. This element promotes the refining of structures and reduces the grain size. It is good for the mechanical properties, but it is necessary to not add too much of it so as not to degrade ductility.

The H content is limited to 5 ppm in order to avoid problems of hydrogen embrittlement. The act of carrying out one or more treatment processes under vacuum during the preparation and production process of the liquid metal, and the preventing of subsequent further contamination of the liquid metal by the ambient humidity, the slag or any possibly added materials generally makes it possible to not exceed this level.

The tolerable content of O would depend, strictly speaking, on the applications envisaged for the final product, as with the tolerable content levels of S, B and other residual elements or of elements that can form precipitates. However the maximum tolerable content is set at 25 ppm, which results from the processes and methods used during the preparation/production of the liquid metal. The goal thus is to not have in the final product, oxides for which the composition, distribution and size could not be controlled.

The Cr content is comprised between trace levels and 5.0%. Its presence is therefore not mandatory, and is to be limited in order to not lower Ms and risk degrading the quality of the inclusion population. But it increases the resistance to oxidation and aids nitriding, in a manner such that there can sometimes be good reasons for an intentional addition thereof. However, it is generally preferred to not add Cr and to let it be present only in trace amounts resulting from the smelting and production process. Such traces are usually considered to be levels that are less than 0.10%, see for example the document EP-B1-1339880, cited in the introduction, which states that 0.06% constitute such "traces". It is possible to reduce the level of Cr to even lower values, by way of a very careful choice of raw materials.

The Cu content is comprised between trace levels and 2.0%. The addition thereof, if any, should be limited because Cu is gamma-phase producing. But Cu is involved in hardening and improves resistance to oxidation, hence the potential beneficial interest of this addition.

The W content is comprised between trace levels and 4.0%. Its presence is therefore not mandatory and it may be added mainly when it is desired to impose a requirement of Co or also Mo content, at fairly low levels, as has been seen here above.

The Zr content is comprised between trace levels and 4.0%. It may desired to add this element in order to enable the contribution thereof to the deoxidation and to the formation of fine nitrides.

Ca and Mg may be found in the metal, in the form of oxides or sulphides, due to the wear of the refractories used for manufacturing. It may also be desired to intentionally add these elements in order for them to contribute to the deoxidation. The final content level is to be limited to 0.1% for each, in order to avoid the formation of oxides, the size and distribution of which could not possibly be controlled.

Up to 4.0% each of Nb, Ta and V may be added, in order to supplement a relatively low Co and/or Mo content level, as has already been seen.

The elements that have not been mentioned are, at most, present only in the form of impurities resulting from the smelting and production process and are not added intentionally.

Compared to the maraging steels discussed in the document EP-B1-1339880, the tendency is thus to be placed at levels of Co and/or Mo content that are higher than those which were preferred at the time.

With regard to the inclusion population, the criterion to be met, according to the invention is that this inclusion population, as observed by means of image analysis over a polished surface measuring 650 mm$^2$ if the steel is in the form of a component part/work piece or a sheet that is hot-formed, and measuring 800 mm$^2$ if the steel is in the form of a cold-rolled sheet, does not include non-metallic inclusions having equivalent diameter greater than 10 μm, preferably does not contain inclusions that are larger than 8 μm in size, and, in the case of a hot-rolled sheet, does not contain more than four non-metallic inclusions having equivalent diameter of 5 μm to 10 μm over 100 mm$^2$ of the hot-formed sheet, the observation being performed by means of image analysis over a polished surface measuring 650 mm$^2$.

The non-metallic inclusions considered are oxides, sulphides and nitrides. The population of oxides is controlled mainly by the selection of preparation and manufacturing methods (controlled deoxidation of the liquid metal, after which care is taken to remove as best possible the large inclusions, in particular by way of the use of remelting processes for remelting the electrode initially cast from the liquid metal). The population of sulphides is controlled by the imposition of very low S content levels, requiring a careful selection of raw materials and/or desulfurisation of the liquid metal. The population of nitrides is controlled by the imposition of low or very low levels of N content, for example thanks to the use of reduced pressures during the preparation and production of the liquid metal and the remelting of the electrode, and to the restriction of Ti content of the metal.

The steels according to the invention are prepared, for example, by the following process routes.

The steel, prepared first of all in the liquid state in order to regulate and control the composition thereof in respect of the essential elements, thereafter is cast in the form of remelting electrodes. These electrodes are:

either remelted once under vacuum (VAR, Vacuum Arc Remelting method known per se), or in electro slag (ESR, Electro Slag Remelting method, known per se) in order to form, after the casting and solidification of the liquid steel, ingots, billets or slabs;

or remelted multiple times under vacuum (VAR) or under an electrically conductive slag (ESR) in order to form, after the casting and solidification, ingots or slabs.

Thus either a single remelting, or a multiple remelting process is carried out, for example VAR+VAR or ESR+VAR. These remelting processes serve the purposes of purifying the metal and of improving the quality of the solidification by reducing the segregations and by refining the solidification structure thereof. In particular, the ESR remelting process makes it possible to effectively lower the sulfur content, and VAR remelting makes it possible to effectively lower the nitrogen content levels.

The ingots or slabs are then hot-rolled, after reheating at temperatures between 1050° C. and 1300° C., typically at around 1200° C., in order to obtain hot-rolled sheets or strips measuring a few millimeters in thickness, for example about 1.5 mm to 5 mm thick.

The hot-rolled products having this thickness may, in certain cases be used either in the hot-rolled raw state or in a controlled recrystallised state. A recrystallisation may possibly already come about to a sufficient extent during the hot rolling and the stay of the hot-rolled strip in coil form, but in the event of it being insufficient to obtain the microstructure and/or the desired mechanical properties, a recrystallisation annealing may then be carried out so as to adjust this recrystallisation. In this latter case, the person skilled in the art would know how to set the parameters of the recrystallisation annealing (temperature, time period, etc) in order to adjust the microstructure (in particular the grain size) and the desired mechanical properties.

The targets, typically after hot rolling and possibly recrystallisation (or even other types of heat treatment processes), are tensile strengths Rm of 1010 MPa or more, a Young's modulus E of 130 GPa or more, and a uniform elongation Ar of 2% or more.

These hot-rolled strips, that are possibly heat treated, may also not be intended to be used directly, and it is thus then necessary to reduce their thickness by subjecting to cold forming for the envisaged applications. In this case, they are pickled, and then cold-rolled, with one or more intermediate annealing operations between the different passes of the cold rolling, and possibly one (or more) final age annealing, recrystallisation annealing, or other types of heat treatment processes, or appropriate surface treatments based on the intended application (which will be detailed subsequently), in order to obtain cold-rolled strips having a thickness less than 2 mm, preferably less than or equal to 1 mm, and for example measuring 0.4 mm or 0.2 mm in thickness.

The recrystallisation treatment of the cold-rolled strip is preferably carried out at a thickness such that the cold-rolled strip has, at this time, a rate of work hardening that is greater than 30%, more preferably greater than 40%. It provides the strip with a grain size of ASTM 8 (average grain diameter of less than 20 μm) or finer, preferably ASTM 10 (average grain diameter of less than 10 μm) or finer (in accordance with the standard ASTM E112, for which it should be recalled that the finer the grain the higher the figure that indicates the grain size).

The annealing treatment intended for obtaining a fine grain is carried out in a protective atmosphere by suitably adjusting the parameters related to temperature and time period. These parameters depend on the particular conditions under which the heat treatment is carried out, and the person skilled in the art knows how to determine these parameters in each particular case.

The preferential requirements in respect of the grain size of the cold-rolled products, that are possibly heat-treated, are moreover also, preferably, valid with respect to the products that are intended for use in the hot-rolled state, possibly after having been heat treated.

In order to improve the flatness of the strip, and, if necessary, to complement and enhance the martensitic transformation, the strip may in addition also be subjected to a light final cold rolling (skin pass or temper rolling) with a reduction ratio of between 1% and 10%.

Typically, the hardening treatments (aging) of the cold-rolled strip are preferably carried out at a thickness such that the cold-rolled strip has, at this time, a rate of work hardening that is greater than 30%, more preferably, greater than 40%.

A work piece then can be cut out of the strip, and this work piece may be subjected to forming, for example by means of folding, welding, etc, and subsequently a hardening treatment may be performed on the latter which consists of maintaining of the temperature between 400° C. and 600° C. for a period of 30 min to 5 hrs (preferably at 420° C. to 550° C. for a period of 30 min to 2 hrs, for example 420° C. for a period of 30 min or 480° C. for a period of 2 hrs).

The hot-rolled products are also liable to be subjected to a hardening treatment, typical of maraging steels with the benefits that are conventionally expected from such a treatment on their mechanical properties.

The products that are cold-rolled, and possibly heat-treated, according to the invention have a tensile strength Rm of at least 2270 MPa, a conventional yield strength $Rp_{0.2}$ of at least 2250 MPa and a uniform elongation Ar of at least 2%.

These characteristic features moreover may also, optimally, be attained on hot-rolled products that are heat-treated in an appropriate manner, for example if they have been subjected to a significant recrystallisation during the hot-forming operation or during a subsequent treatment that leads to such recrystallisation.

The products may subsequently be surface hardened (nitriding, cementation or carburising, carbonitriding, shot preening, etc) in order to increase their fatigue-related performance aspects. Typically, at equivalent stress, the products thus obtained may have fatigue life times that are greater by 10000 to 50000 cycles than those of conventional grades, or, for an equal life time, withstand a stress increased by more than 50 MPa. The extreme surface hardness HV0.1 may be typically at least 1050 without methods and conditions of nitriding other than standard methods and conditions being necessary.

Experiments were conducted on six samples of a steel in accordance with the invention and on reference samples, whose compositions are summarised in Table 1, expressed in % by weight, or in ppm for certain elements. The remainder consists of iron and impurities resulting from the smelting and production process and are at a level deemed to be of no significance for the properties considered.

TABLE 1

Compositions of the tested samples

| Sample | Ni | Mo | Co | Al | Ti | N (ppm) | Si | Mn | C | S | P | B | $H_2$ (ppm) | O (ppm) |
|---|---|---|---|---|---|---|---|---|---|---|---|---|---|---|
| Inv. 1 | 18.20 | 7.00 | 17.68 | 0.083 | 0.007 | 19 | 0.040 | 0.077 | 0.002 | 0.0006 | 0.0023 | 0.0005 | 0.2 | 5 |
| Inv. 2 | 18.14 | 4.96 | 19.82 | 0.04 | <0.005 | 28 | 0.050 | 0.088 | 0.003 | 0.0002 | 0.0029 | <0.0002 | <0.2 | 21 |

TABLE 1-continued

Compositions of the tested samples

| | | | | | | | | | | | | | |
|---|---|---|---|---|---|---|---|---|---|---|---|---|---|
| Inv. 3 | 18.24 | 7.07 | 15.78 | <0.005 | 0.007 | 34 | 0.049 | 0.088 | 0.003 | <0.0002 | 0.0030 | 0.0004 | <0.2 | 6 |
| Inv. 4 | 18.12 | 6.96 | 16.05 | 0.026 | 0.007 | 18 | 0.040 | 0.195 | 0.002 | 0.0003 | 0.0024 | 0.0002 | <0.2 | 5 |
| Inv. 5 | 18.15 | 6.96 | 20.02 | 0.018 | 0.007 | 24 | 0.050 | 0.100 | 0.003 | 0.0005 | 0.0030 | 0.0003 | <0.2 | 7 |
| Inv. 6 | 18.24 | 5.21 | 18.14 | 0.030 | 0.007 | 22 | 0.070 | 0.120 | 0.002 | 0.0004 | 0.0021 | 0.0004 | <0.2 | 6 |
| Inv. 7 | 18.3 | 4.98 | 20.12 | 0.02 | <0.005 | 15 | 0.08 | 0.600 | 0.002 | 0.0003 | 0.0027 | 0.0002 | <0.2 | 7 |
| Ref 1 | 18.18 | 5.30 | 16.41 | 0.023 | <0.005 | 8 | 0.068 | 0.071 | 0.007 | 0.0004 | 0.0022 | <0.0002 | <0.2 | <5 |
| Ref 2 | 18.33 | 4.98 | 8.99 | 0.116 | 0.473 | <5 | 0.047 | <0.005 | 0.006 | 0.0004 | 0.0030 | <0.0002 | <0.2 | <5 |

| Sample | Cr | Cu | W | Zr | Ca | Mg | Nb | V | Ta | Mo + Co + Si + Mn + Cu + W + V + Nb + Zr + Ta + Cr + C | Co + Mo | Ni + Co + Mo | Fe |
|---|---|---|---|---|---|---|---|---|---|---|---|---|---|
| Inv. 1 | 0.055 | 0.056 | traces | <0.002 | 0.0010 | traces | traces | traces | traces | 24.91 | 24.68 | 42.88 | remainder |
| Inv. 2 | 0.063 | 0.069 | traces | <0.002 | 0.0011 | traces | traces | traces | traces | 25.05 | 24.78 | 42.92 | remainder |
| Inv. 3 | 0.069 | 0.063 | traces | <0.002 | 0.0011 | traces | traces | traces | traces | 23.12 | 22.85 | 41.09 | remainder |
| Inv. 4 | 0.030 | 0.056 | traces | <0.002 | 0.0010 | traces | traces | traces | traces | 23.3 | 23.01 | 41.13 | remainder |
| Inv. 5 | 0.040 | 0.056 | traces | <0.002 | 0.0010 | traces | traces | traces | traces | 27.2 | 26.98 | 45.13 | remainder |
| Inv. 6 | 0.050 | 0.056 | traces | <0.002 | 0.0010 | traces | traces | traces | traces | 23.6 | 23.35 | 41.59 | remainder |
| Inv. 7 | 0.050 | 0.056 | traces | <0.002 | 0.0010 | traces | traces | traces | traces | 25.9 | 25.10 | 43.4 | remainder |
| Ref. 1 | 0.067 | 0.065 | traces | <0.002 | <0.0005 | traces | traces | traces | traces | 21.92 | 21.71 | 39.89 | remainder |
| Ref 2 | 0.065 | 0.005 | traces | <0.002 | 0.0006 | traces | traces | traces | traces | 14.10 | 13.97 | 32.3 | remainder |

The preparation and manufacturing processes for the steels according to the invention and for the reference steels, from which the samples for Table 1 were taken, were performed according to the following scheme, in a manner such as to obtain strips measuring 0.4 mm in thickness.

For Ref. 1 and 2 and for Inv. 1, 5 and 7, the steel was prepared and treated in a ladle, and then the VIM (Vacuum Induction Melting) process, followed by the VAR process (Vacuum Argon Remelting) were applied.

For Inv. 2, 3, 4 and 6, the steel was prepared and treated in a ladle, and thereafter the VIM process, followed by the ESR (Electro Slag Remelting) process were then applied.

Then the VAR or ESR ingots were transformed into slabs by blooming with a reduction in thickness taking this thickness to between 200 and 100 mm (typically 160 mm).

Then the slabs were hot-rolled until attaining a thickness of 3.5 mm, after being subjected to reheating to approximately 1300° C. The metal was then pickled, and was cold-rolled until attaining a thickness of 0.4 mm. The austenitizing annealing or solution annealing, the recrystallisation annealing and the age annealing were performed respectively between 800° C. and 1000° C. for a period of 15 min to 60 min, and then between 350° C. and 600° C. for a period of 30 min to 240 min, and between 420° C. and 510° C. for a period of 30 min to 90 min.

Table 2 presents the inclusion densities of each sample included in Table 1, upon conclusion of the hot rolling. They have first of all been evaluated and measured in accordance with the DIN 50602-M standard, then refined in counting by means of optical microscopy image analysis on areas of 650 mm$^2$ of samples of hot-rolled strips measuring 3.5 mm in thickness. Then these densities were reduced to a 100 mm$^2$ sample surface area. It should be noted that the term "diameter" of the inclusions is understood to refer to "equivalent diameter", that is to say the diameter of an inclusion which would have a circular cross section and have the same surface area as the observed inclusion, if the latter has a more complex cross section than that of a simple circle. In addition, with the optical image analysis only distinguishing colour contrasts and not differentiating the composition of the inclusions, the inclusions referred to as "TiN", in the table here below, are inclusions with orange coloured contrast through the skills of the person skilled in the art (which can be verified a posteriori by means of scanning electron microscopy). Inclusions denoted as "oxides" are the inclusions with grey contrast in optical microscopy (these inclusions are effectively oxides, or indeed, in lesser proportions, sulphides, or mixed sulphide-oxide inclusions). These analyses are quite common for the person skilled in the art and supplemented, in this present case, by analyses using automated scanning electron microscopy.

TABLE 2

Inclusion densities of the various rolled samples tested, reduced to a particle density per 100 mm$^2$

| Sample | TiN inclusions >10 μm | TiN inclusions from 5 μm to 10 μm | Oxide inclusions >10 μm | Oxide inclusions from 5 μm to 10 μm |
|---|---|---|---|---|
| Inv. 1 | 0.0 | 0.0 | 0.0 | 3.1 |
| Inv. 2 | 0.0 | 0.0 | 0.0 | 2.3 |
| Inv. 3 | 0.0 | 0.0 | 0.0 | 1.6 |
| Inv. 4 | 0.0 | 0.0 | 0.0 | 1.9 |
| Inv. 5 | 0.0 | 0.0 | 0.0 | 3.6 |
| Inv. 6 | 0.0 | 0.0 | 0.0 | 2.1 |
| Inv. 7 | 0.0 | 0.0 | 0.0 | 1.7 |
| Ref. 1 | 0.0 | 0.0 | 0.0 | 8.9 |
| Ref. 2 | 0.8 | 40.8 | Not measured | Not measured |

These results show that in the case of the samples according to the invention, low inclusion densities are obtained along with a complete absence of relatively large size inclusions, that is to say, greater than 10 μm. Such large inclusions are also absent from the reference sample 1, but the number of small oxide inclusions (5 μm to 10 μm in diameter) is significantly higher than in the case of the samples according to the invention, which is unfavourable to the mechanical properties and does not correspond to the optimum inclusion density intended. As to the reference sample 2, it has an excessively high density of nitrides including nitrides measuring more than 10 μm in size. This characteristic is, in itself, prohibitive to the achievement of the desired objective of an excellent fatigue strength, and it was not deemed useful to focus on the oxides of this sample.

Table 3 shows the maximum size of inclusions observed over surfaces of 650 mm² of the aforementioned hot-rolled samples.

TABLE 3

Maximum size of inclusions observed over 650 mm² sample surfaces of the various hot-rolled samples tested

| Sample | Size of the largest inclusion (μm) | Nature of the largest inclusion |
|---|---|---|
| Inv. 1 | 6.18 | oxide |
| Inv. 2 | 6.12 | oxide |
| Inv. 3 | 5.71 | oxide |
| Inv. 4 | 6.54 | oxide |
| Inv. 5 | 7.32 | oxide |
| Inv. 6 | 6.12 | oxide |
| Inv. 7 | 8.78 | oxide |
| Ref. 1 | 7.76 | oxide |
| Ref. 2 | 10.60 | TiN |

The samples according to the invention therefore comprise only small diameter inclusions, and in very low numbers. In particular there is no Ti nitride, which is linked in particular to the absence of Ti and to the very low content of N. The reference sample 1 is in the same case, although the density of inclusions and the diameter of its largest inclusions are somewhat higher than in the case of the invention. As for the reference sample 2, it was confirmed that nitrides (mainly of Ti) are predominant therein and present in the form of inclusions that are slightly ductile and with sizes that are often too large in order for the objectives of an excellent fatigue strength to be able to be met.

Observations by means of electron and optical microscopy also showed that the presence of inclusions of all types having an equivalent diameter less than 5 μm was low, particularly for the sample Inv. 3 which is also one that contains less oxides of 5 μm to 10 μm.

The person skilled in the art knows that the cold forming would affect the size of inclusions only downwards by breaking them down eventually, but cannot in any case increase these proportions.

Finally, the inclusion populations were more precisely characterised by automated counting and analysis in a scanning electron microscope with field emission gun (SEM FEG) over surfaces of 200 to 2 mm² (by respective magnifications of ×300, ×1000, ×10000), and their estimated areal densities.

The grades according to the invention, as well as the reference grade 1, present the advantage, due to their intrinsic chemical composition, of not forming nitrides during the preparation and manufacturing processes, and of providing the ability to control the size and nature of the residual inclusions, in particular oxides. With the application of careful control of the raw materials used and of the preparation and production processes implemented, that provide for low content levels of residual elements N, S and P, and thanks to a deoxidation of the liquid metal, the oxides formed particles are of limited sizes, less than 10 μm, preferably less than 8 μm, and having appropriate compositions obtained by the ranges of preparation and production processes described. In a favoured manner aluminum based oxides are formed, for example mixed oxides of Al and Mg (this element being inevitably derived from the slags and refractories of the preparation and production process recipients), and also, possibly, of alumina in varying proportions.

The proportion by volume fraction of these families of oxides that are aluminum based or contain significant levels thereof is greater than 30%, with the understanding that:

the pure alumina type oxides are distinguished by Al content greater than 35% and O content less than 65% (content levels measured by energy dispersive spectroscopy EDX);

the oxides containing magnesium are distinguished by EDX analysis by the presence of: Mg at levels of more than 1.5%, Al at levels of more than 10%, and O at levels of more than 60%, this latter family may contain minor proportions of Ca and/or Si, or be associated with sulphides in small sizes.

The important mechanical properties of the various different samples (except for the fatigue-related properties, which will be seen here below) are summarised in the Tables 4, 5 and 6, with the Table 4 pertaining to the samples in hot-rolled stage, the Table 5 pertaining to the samples in cold-rolled state, prior to the aging annealing bringing about the precipitation hardening, and the Table 6 corresponding to the cold-rolled and aged state. The properties were measured in both the longitudinal direction relative to the direction of rolling of the strip and along the transverse direction, perpendicular to the said rolling direction. These properties are the Young's modulus E (for the hot-rolled samples), the Vickers hardness HV 1 (for the cold-rolled samples, unaged and aged), the conventional yield strength $Rp_{0.2}$ (expressed in MPa), the maximum tensile strength Rm (expressed in MPa), elongation at break A, uniform elongation Ar (expressed in % and measured from specimens of length $L_0$ equal to 5.65 times the root square of the initial section $S_0$) and the total elongation At.

TABLE 4

Mechanical properties of the samples in the hot-rolled state

| Sample | | E (MPa) | $Rp_{0.2}$ (MPa) | Rm (MPa) | Ar (%) | At (%) |
|---|---|---|---|---|---|---|
| Inv. 1 | Longitudinal direction | 174 285 | 871 | 1046 | 2.5 | 22.0 |
| | Transverse direction | 163 614 | 838 | 1051 | 3.1 | 22.6 |
| Inv. 2 | Longitudinal direction | 176 466 | 868 | 1013 | 2.0 | 20.2 |
| | Transverse direction | 172 838 | 860 | 1018 | 2.0 | 20.7 |
| Inv. 3 | Longitudinal direction | 157 539 | 843 | 1048 | 3.7 | 22.5 |
| | Transverse direction | 131 607 | 751 | 1 046 | 3 2 | 18.8 |
| Inv. 4 | Longitudinal direction | 149 278 | 837 | 1047 | 3.5 | 20.6 |
| Inv. 5 | Longitudinal direction | 174 658 | 862 | 1020 | 2.1 | 20.5 |
| Inv. 6 | Longitudinal direction | 166 634 | 841 | 1045 | 2.6 | 18.6 |
| Inv. 7 | Longitudinal direction | 177 206 | 870 | 1015 | 2.0 | 20.4 |
| Ref. 1 | Longitudinal direction | 173 863 | 783 | 1051 | 1.9 | 14.6 |
| | Transverse direction | 167 658 | 757 | 1053 | 1.8 | 14.9 |

TABLE 5

Mechanical properties of the samples in the cold-rolled state

| Sample | | HV 1 | $Rp_{0.2}$ (MPa) | Rm (MPa) | A (%) |
|---|---|---|---|---|---|
| Inv. 1 | Longitudinal direction | 385 | 1358 | 1378 | 5.0 |
| | Transverse direction | 394 | 1417 | 1451 | 3.1 |

TABLE 5-continued

Mechanical properties of the samples in the cold-rolled state

| | Sample | HV 1 | Rp$_{0.2}$ (MPa) | Rm (MPa) | A (%) |
|---|---|---|---|---|---|
| Inv. 2 | Longitudinal direction | 370 | 1269 | 1294 | 5.6 |
| | Transverse direction | 372 | 1336 | 1368 | 3.3 |
| Inv. 3 | Longitudinal direction | 390 | 1348 | 1369 | 4.8 |
| | Transverse direction | 392 | 1407 | 1438 | 3.0 |
| Inv. 4 | Longitudinal direction | 391 | 1354 | 1375 | 4.5 |
| Inv. 5 | Longitudinal direction | 389 | 1360 | 1382 | 4.8 |
| Inv. 6 | Longitudinal direction | 376 | 1260 | 1304 | 5.1 |
| Inv. 7 | Longitudinal direction | 374 | 1276 | 1318 | 4.9 |
| Ref. 1 | Longitudinal direction | 370 | 1226 | 1198 | 5.7 |
| | Transverse direction | 373 | 1272 | 1284 | 5.2 |
| Ref. 2 | Longitudinal direction | 315 | 987 | 1021 | 11.4 |
| | Transverse direction | 318 | 1022 | 1058 | 8.7 |

TABLE 6

Mechanical properties of the samples in the cold-rolled and aged state

| | Sample | HV 1 | Rp$_{0.2}$ (MPa) | Rm (MPa) | A (%) |
|---|---|---|---|---|---|
| Inv. 1 | Longitudinal direction | 669 | 2329 | 2353 | 2.7 |
| | Transverse direction | 671 | 2349 | 2373 | 2.0 |
| Inv. 2 | Longitudinal direction | 663 | 2251 | 2269 | 2.7 |
| | Transverse direction | 660 | 2284 | 2299 | 2.3 |
| Inv. 3 | Longitudinal direction | 658 | 2258 | 2277 | 2.0 |
| | Transverse direction | 667 | 2309 | 2330 | 2.0 |
| Inv. 4 | Longitudinal direction | 660 | 2260 | 2278 | 2.6 |
| Inv. 5 | Longitudinal direction | 676 | 2332 | 2360 | 2.1 |
| Inv. 6 | Longitudinal direction | 636 | 2174 | 2204 | 2.8 |
| Inv. 7 | Longitudinal direction | 666 | 2276 | 2302 | 2.3 |
| Ref. 1 | Longitudinal direction | 621 | 2101 | 2132 | 2.6 |
| | Transverse direction | 624 | 2139 | 2159 | 2.5 |
| Ref. 2 | Longitudinal direction | 536 | 1823 | 1850 | 4.9 |
| | Transverse direction | 539 | 1845 | 1880 | 4.8 |

As could be expected, those mechanical properties which are the most important for the favoured applications of the invention in the case of cold-rolled products are indeed much more favourable after aging than they are after simple rolling, and the aging also makes it possible to greatly reduce the differences between the yield strengths, the tensile strengths and elongations at break in the longitudinal direction and in the transverse direction noted over the cold-rolled state.

It is also to be noted that the example Inv. 6, after aging, did not have a tensile strength and yield strength which corresponded to the targets pursued at this stage. This is probably attributed to the fact that its Mo content is relatively low and that its Co content does not contribute to compensating for this weakness in order to obtain optimal properties after aging. It is to be compared with the example Inv. 2 for which the Mo content is relatively low, but where the Co content which is substantially higher than for Inv. 6 provides the ability to obtain this compensation. The example Inv. 6 is nevertheless to be regarded as part of the invention, due to the fact that its properties in hot-rolled state are in conformity with the requirements of the corresponding variant of the invention.

It was also noted that for the solution heat treatment and aging heat treatment processes that are a little different from that provided as example for the preparation of the Table 6, the hardness values obtained varied relatively little. For the sample Inv. 1 treated at 850° C. for a period of 30 min and then at 450° C. for a period of 2 hrs, the resulting hardness obtained is 699 HV 1. For the sample Inv. 2 treated at 850° C. for a period of 30 min and then at 500° C. for a period of 1 hr, the resulting hardness obtained is 642 HV 1. For the sample Inv. 3 treated at 850° C. for a period of 30 min and then at 450° C. for 4 hrs, the resulting hardness obtained is 678 HV 1.

The aging conditions were explored on cold-rolled products with a view to their optimisation (after standardisation annealing or solution annealing). A solution annealing at 850° C. for a period of 30 minutes under argon was previously carried out on each grade (among several conditions explored between 800° C. and 1000° C. under argon), providing the ability to access an austenitic and homogeneous structure. Thereafter various different pairs (time and temperature) were experimentally tested on these annealed materials in order to specify the aging conditions suitable for the intended applications.

Then in accordance with the aging conditions explored under argon between 350° C. and 600° C., the optimum values in terms of hardness were specified.

The grade Inv. 1 preferred aging conditions comprised between 450° C. and 550° C. for periods of 30 min to 5 hrs, in order to attain hardness levels Hv in the aged state of more than 675. Hardness of 730 Hv was attained for an aging process at 500° C. for a period of 1 hr.

The grade Inv. 2 can attain surface hardness levels that are greater than 600 Hv for aging processes at less than 550° C., for periods of 30 min to 5 hrs, preferably at 500° C. for a period of 1 hr in order to attain 630 Hv to 640 Hv;

The grade Inv. 3 can attain surface hardness levels that are greater than 650 Hv for aging processes at temperatures higher than 550° C. for a period of 30 min to 5 hrs.

For aging conditions comprised between 450° C. and 550° C. for a period of 30 min to 3 hrs, the grades Inv. 4 and Inv. 5 accessed levels of hardness that were higher than 650 Hv with treatment time periods of less than 2 hrs. By way of example, hardness levels of 660 Hv for Inv. 4, and 676 Hv for Inv. 5, were obtained for treatments under Ar at 480° C. for a period of 3 hrs.

Similarly the grades Inv. 6 and Inv. 7 present respective hardness levels of 636 Hv and 666 HV with aging conditions of 3 hrs at 480° C.

It is notable here that these grades of the invention are compatible with aging conditions that allow for enhanced mechanical characteristics, and that they however, in addition, present facilities of application and use both in terms of methods and processes as well as associated costs. Indeed the stability of the resulting properties obtained, in particular the hardness, makes possible the implementation of annealing operations of short duration (typically 30 minutes) in order to obtain the properties that are identical or comparable to those obtained by treatment processes carried out over a period of 4 to 5 hrs over conventional grades. These qualities of simplicity and economy of heat treatments are particularly advantageous for these grades according to the invention.

These new grades according to the invention present enhanced mechanical properties (hardness, yield strength, tensile strength . . . ) relative to the reference samples Ref. 1 and Ref. 2, under optimised aging conditions, which, together with an improved inclusion population, make it possible to access properties that are also enhanced during dynamic stresses, fatigue stresses for example.

In this regard samples according to the invention and the sample Ref. 1 were fatigue tested, in the non-nitrided aged state, on an INSTRON hydraulic testing apparatus at a frequency of 25 Hz, with stress ratio R=0.1, on cold-rolled materials (thickness measuring less than 5 mm) treated at 850° C. for a period of 30 min and then at 450° C. for a period of 2 hrs under Ar. These aging conditions are not optimised for all the grades, but make it possible to compare the grades to each other under a same given aging condition). The results of these stress tests are presented in FIG. 1. It shows as a function of the number of cycles imposed the stress level at which a break was observed on the various samples. Also reported for each sample were the results obtained for the test carried out for a very high number of cycles greater than 10 million (three tests for the sample Inv. 2, one test for the others), with stress levels which do not lead to breakage of the sample.

From 50000 cycles the examples according to the invention Inv. 1, Inv. 2 and Inv. 3 resist to greater endurance stresses than the reference 1, and greater than the imposed stress, the endurance of the examples according to the invention is greatly increased. The sample Reference 2 was not tested because given its content of nitrides it was assured that its fatigue tests would give inferior quality results as compared to those of the other samples.

Finally, the improved properties of these grades according to the invention have also been explored after a treatment of subjecting the surface to compression. In this case, with regard to these fine thickness materials subjected to fatigue stresses, the nitriding treatments are traditionally implemented before subjecting to stresses, in order to retard the initiation of surface cracking. This placing under compression may also be performed by means of shot peening, in a known manner.

Thus, various conditions of nitriding were tested for the grades according to the invention, among which were included treatments at temperatures comprised between 420° C. and 510° C. for periods of 30 min to 90 min in gaseous atmosphere (under $NH_3$ or under a cracked $NH_3$ atmosphere), as well as by ion nitriding.

Nitrided layers are formed by the diffusion of nitrogen within the various matrices, constituting characteristic thicknesses of a few tens of μm, estimated by chemical etching or by profile analysis with glow discharge spectrometry (GDS). They may sometimes contain fine precipitates distributed uniformly, in respect whereof it is possible, if useful, to adjust the chemical nature by adjusting the composition of the steel and the conditions of nitriding.

In the range of temperatures and treatment time periods explored, the grades according to the invention reveal enhanced surface properties after nitriding, when they are compared to the references 1 and 2. The Table 7 illustrates by way of an example of hardness levels evaluated by micro indentation based on identical conditions and modalities. Three cases of nitriding treatments were tested, in addition to variable conditions of time periods and temperature:

Gas nitriding under $NH_3$ (tests NG1);
Gas nitriding under cracked $NH_3$ (tests NG2);
Ion nitriding (tests NI).

TABLE 7

Hardness Hv0.1 evaluated by extreme surface micro indentation under different nitriding conditions.

| | Ref. 2 | | | Ref. 1 | | | Inv. 1 | | | Inv. 2 | | |
|---|---|---|---|---|---|---|---|---|---|---|---|---|
| Nitriding | NG1 | NG2 | NI | NG1 | NG2 | NI | NG1 | NG2 | NI | NG1 | NG2 | NI |
| 420° C., 30 min | 820 | 775 | 610 | 880 | 660 | 820 | 900 | 860 | 850 | 940 | 1008 | 1020 |
| 420° C., 60 min | 650 | | 840 | 780 | | 910 | 1000 | | 900 | 840 | | 925 |
| 420° C., 90 min | 820 | | 685 | 685 | | 900 | 860 | | 1070 | 810 | | 1040 |
| 450° C., 30 min | 995 | 922.5 | 785 | 720 | 625 | 1030 | 900 | 870 | 970 | 790 | 875 | 865 |
| 450° C., 60 min | 765 | | 840 | 745 | | 980 | 805 | | 1055 | 910 | | 920 |
| 450° C., 90 min | 940 | | 750 | 800 | | 980 | 725 | | 970 | 810 | | 880 |
| 480° C., 30 min | 1105 | 900 | 660 | 780 | 887 | 985 | 940 | 890 | 1095 | 825 | 940 | 860 |
| 480° C., 60 min | 1125 | | 900 | 1050 | | 740 | 820 | | 930 | 815 | | 800 |
| 480° C., 90 min | 950 | | 940 | 870 | | 840 | 780 | | 1100 | 700 | | 920 |
| 510° C., 30 min | 855 | 680 | 945 | 700 | 900 | 840 | 750 | 848 | 985 | 720 | 773 | 1065 |
| 510° C., 60 min | 690 | | 870 | 965 | | 760 | 770 | | 730 | 815 | | 880 |
| 510° C., 90 min | 830 | | 850 | 690 | | 890 | 590 | | 750 | 590 | | 790 |

TABLE 7-continued

Hardness Hv0.1 evaluated by extreme surface micro indentation under different nitriding conditions.

| | Inv. 3 | | | Inv. 4 | Inv. 5 | Inv. 6 | Inv. 7 |
|---|---|---|---|---|---|---|---|
| Nitriding | NG1 | NG2 | NI | NG2 | NG2 | NG2 | NG2 |
| 420° C., 30 min | 790 | 860 | 820 | 900 | 1010 | 710 | 1015 |
| 420° C., 60 min | 1320 | | 1000 | | | | |
| 420° C., 90 min | 1020 | | 1105 | | | | |
| 450° C., 30 min | 950 | 995 | 950 | 1002 | 980 | 650 | 940 |
| 450° C., 60 min | 555 | | 1085 | | | | |
| 450° C., 90 min | 620 | | 855 | | | | |
| 480° C., 30 min | 740 | 943 | 880 | 985 | 945 | 880 | 960 |
| 480° C., 60 min | 940 | | 660 | | | | |
| 480° C., 90 min | 960 | | 910 | | | | |
| 510° C., 30 min | 780 | 933 | 995 | 940 | 850 | 800 | 850 |
| 510° C., 60 min | 820 | | 820 | | | | |
| 510° C., 90 min | 760 | | 775 | | | | |

It should be understood that the measurement uncertainties of such type of tests are significant when, as is the case here, the tests are carried out on samples with rough surfaces and local impressions. It is therefore necessary to interpret the results in Table 7 in terms of the overall general trend.

Thus, in addition to having a high-performance fatigue matrix, the samples according to the invention exhibit in particular a better mechanical strength on the surface and enhanced resistance to frictions, due to an increase in the surface hardness after nitriding as compared to the reference samples 1 and 2. Thus, gains of more than 50 Hv0.1 as compared to the reference samples 1 and 2 may be easily anticipated, for reduced nitriding times. Extreme surface hardness levels may thus be expected to reach more than 1050 Hv0.1 for the grades according to the invention, under conditions of nitriding that are appropriate and adequate and not particularly demanding.

The minimum and maximum values of hardness achieved at the extreme surface based on different conditions of nitriding for the samples Ref. 1 and 2 and Inv. 1 to 3 are reported in FIG. 3.

Finally, it was verified that these significant hardness levels accessible at the surface are accompanied by the presence of residual stresses (measured by X-ray diffraction) which make it possible to place the surface under compression relative to the matrix and to retard the initiation of surface cracking.

FIG. 2 is a qualitative assessment of compressive residual stresses on the surface of the nitrided rolled sheets, for the samples Ref. 1, Ref. 2, Inv. 1, Inv. 2, and Inv. 3. For each sample the figure presents the plotted minimum and maximum values of compressive stresses evaluated for all the tests carried out by varying processes, temperatures, and nitriding time periods. The evaluation of residual stresses within the nitrided layers was carried out at the surface of the samples with the following parameters: Chi varying from 0 to 51°, measurement interval 1 s, $\sin^2$ (psi) from 0 to 0.6 in increments of 0.1. The values obtained under these conditions make it possible to determine by following the changes in the position of the line of Fe the stress level in the material surface. It is seen that the residual stress of the samples according to the invention are not degraded in a significant manner as compared with those observed on the reference samples.

It is also easier, through the use of the invention, to control the composition of the nitrided layer and, therefore, to adapt it to the specific needs of the intended use for future products. Whereas this appears to be preferable, the presence at the extreme surface of phases commonly known as "combination layers" within the nitrided layers may thus be easily prevented. These phases result from the precipitation of iron nitrides of such types as $Fe_4N$, $Fe_2N$, $Fe_2N_{1-x}$, etc In a general manner, the steels according to the invention present under different conditions of nitriding, enhanced economic and use performance aspects as compared to the reference steels falling within the scope of the prior art, insofar as the nitriding layer is more easily controllable:
  in respect of its composition, in particular concerning the existence or not of combination layers;
  in respect of its thickness;
  in respect of the hardness levels accessible under the given conditions of nitriding;
  in respect of the distribution in the thickness of the layer of the nitrogen content, of the precipitated phases, of their nature and their distribution, as well as levels of hardness, residual stresses;
  in respect of the ease and economics of the conditions of industrial implementation of the nitriding process, with equivalent properties obtained relative to the reference grades, regardless of whether the nitriding is carried out by plasma, or especially by the gaseous process route.

The preferred applications of the invention are, in particular:
  for products derived from semi-finished products that are hot-rolled or subjected to hot forming, turbine shafts or transmission component parts in general;

for products derived from cold-rolled sheets or strips, elements of transmission belts for vehicles or rotating machines such as machine tools, in particular belts for CVT-type automatic transmissions for motor vehicles.

The invention claimed is:

1. Steel, wherein its composition, in percentages by weight is as follows:
10.0%≤Ni≤24.5%;
1.0%≤Mo≤12.0%;
1.0%≤Co≤25.0%;
22.5%≤Mo+Co+Si+Mn+Cu+W+V+Nb+Zr+Ta+Cr+C≤29.0%;
Co+Mo≥22.0%;
Ni+Co+Mo≥41.0%;
traces≤Al≤4.0%;
traces≤Ti≤0.1%;
traces≤N≤0.0050%;
0.04%≤Si≤2.0%;
traces≤Mn≤4.0%;
traces≤C≤0.03%;
traces≤S≤0.0020%;
traces≤P≤0.005%;
traces≤B≤0.01%;
traces≤H≤0.0005%;
traces≤O≤0.0025%;
traces≤Cr≤5.0%;
traces≤Cu≤2.0%;
traces≤W≤4.0%;
traces≤Zr≤4.0%;
traces≤Ca≤0.1%;
traces≤Mg≤0.1%;
traces≤Nb≤4.0%;
traces≤V≤4.0%;
traces≤Ta≤4.0%;

with the remainder being iron and impurities resulting from the smelting and manufacturing process;

and in that the population of oxide, nitride, and sulfide inclusions, as observed by means of image analysis over a polished surface measuring 650 mm² if the steel is in the form of a component part/work piece that is hot-formed or a hot-rolled sheet; and measuring 800 mm² if the steel is in the form of a cold-rolled sheet, does not contain any oxide, nitride, and sulfide inclusions having equivalent diameter greater than 10 μm, and, in the case of a hot-rolled sheet, does not contain more than four inclusions within the population of oxide, nitride, and sulfide inclusions having equivalent diameter of 5 μm to 10 μm over 100 mm², the observation being performed by means of image analysis over a polished surface measuring 650 mm².

2. Steel according to claim 1, wherein 18.0%≤Ni+Mo≤27.0%.

3. Steel according to claim 1, wherein Cr is present only in trace amounts resulting from the smelting and manufacturing process.

4. Steel according to claim 1, wherein traces≤Cr<0.10%.

5. The steel of claim 1 wherein:
12.0%≤Ni≤24.5%,
2.5%≤Mo≤9.0%;
0.01%≤Al≤1.0%;
traces≤S≤0.0010%.

6. The steel according to claim 1 wherein the population of oxide, nitride, and sulfide inclusions does not contain any oxide, nitride, and sulfide inclusions having equivalent diameter greater than 8 μm in the case of steel in the form of the component part/work piece and the cold-rolled sheet.

7. A manufacturing method for the manufacture of a product made of steel, wherein
a remelting electrode is prepared being made from a steel whose composition is in conformity with claim 1;
the remelting of this electrode is performed by means of a single or multiple remelting process in order to obtain a remelted electrode;
at least one process of hot forming of the remelted electrode is carried out, at a temperature comprised between 1050° C. and 1300° C., in order to obtain a hot-formed sheet or a hot-formed strip;
and optionally a heat treatment process is carried out on the said hot-formed sheet or the said hot-formed strip;
thereby producing the steel of claim 1.

8. A method according to claim 7, wherein the said hot-formed sheet or strip, possibly heat treated, has a tensile strength that is greater than or equal to 1010 MPa, a Young's modulus greater than or equal to 130 GPa, and a uniform elongation greater than or equal to 2%.

9. A method according to claim 7, wherein the said sheet that is hot-formed or the said strip that is hot-formed and possibly heat-treated may subsequently be cold-rolled in one or more passes in order to obtain a sheet or a strip having a thickness that is less than or equal to 2 mm.

10. A method according to claim 9, wherein the sheet or strip may be subjected to at least one heat treatment process between cold rolling passes and/or after the last cold rolling pass.

11. A method according to claim 9, wherein the cumulative rate of cold rolling of various passes may be at least 30%.

12. A method according to claim 7, wherein the said sheet or strip that is hot-rolled or cold-rolled and possibly heat-treated may have a tensile strength that is greater than or equal to 2270 MPa, a yield strength greater than or equal to 2250 MPa, and a uniform elongation greater than or equal to 2%.

13. A method according to claim 7, wherein the said sheet or strip that is hot-rolled or cold-rolled and possibly heat-treated may be cut, and subsequently possibly subjected to forming.

14. A method according to claim 13, wherein the said sheet or strip that is hot-rolled or cold-rolled and possibly heat-treated, cut and, possibly, subjected to forming, may be subjected to a hardening treatment between 420° C. and 550° C. for a period of 30 min to 2 hrs.

15. A method according to claim 14, wherein the said sheet or strip that is hot-rolled or cold-rolled, and possibly heat-treated, cut and, possibly, subjected to forming, may be subjected, after its hardening, to a surface treatment process for improving its resistance to dynamic loads.

16. A method according to claim 15, wherein the said surface treatment may be a process of carburising, or gas nitriding, or ion nitriding, or carbonitriding, or shot peening.

17. A method according to claim 7, wherein the grain size of the hot-rolled sheet or strip that is possibly heat-treated, or of the cold-rolled sheet or strip that is possibly heat-treated, may be 8 ASTM or finer.

18. A method according to claim 7, wherein the said sheet or strip that is hot-rolled or cold-rolled and possibly heat-treated is cut, and subsequently subjected to forming.

19. A product made of steel that has been subjected to a heat forming process and that has possibly been heat-treated, wherein the composition thereof, in percentages by weight is as follows:
10.0%≤Ni≤24.5%;
1.0%≤Mo≤12.0%;

1.0%≤Co≤25.0%;
22.5%≤Mo+Co+Si+Mn+Cu+W+V+Nb+Zr+Ta+Cr+ C≤29.0%;
Co+Mo≥22.0%;
Ni+Co+Mo≥41.0%;
traces≤Al≤4.0%;
traces≤Ti≤0.1%;
traces≤N≤0.0050%;
0.04%≤Si≤2.0%;
traces≤Mn≤4.0%;
traces≤C≤0.03%;
traces≤S≤0.0020%;
traces≤P≤0.005%;
traces≤B≤0.01%;
traces≤H≤0.0005%;
traces≤O≤0.0025%;
traces≤Cr≤5.0%;
traces≤Cu≤2.0%;
traces≤W≤4.0%;
traces≤Zr≤4.0%;
traces≤Ca≤0.1%;
traces≤Mg≤0.1%;
traces≤Nb≤4.0%;
traces≤V≤4.0%;
traces≤Ta≤4.0%;
with the remainder being iron and impurities resulting from the smelting and manufacturing process;
and in that the population of oxide, nitride, and sulfide inclusions, as observed by means of image analysis over a polished surface measuring 650 mm$^2$ if the steel is in the form of a component part/work piece that is hot-formed or a hot-rolled sheet; and measuring 800 mm$^2$ if the steel is in the form of a cold-rolled sheet, does not contain any oxide, nitride, and sulfide inclusions having equivalent diameter greater than 10 μm, and, in the case of a hot-rolled sheet, does not contain more than four inclusions within the population of oxide, nitride, and sulfide inclusions having equivalent diameter of 5 μm to 10 μm over 100 mm$^2$, the observation being performed by means of image analysis over a polished surface measuring 650 mm$^2$.

20. A product made of steel that has been subjected to a heat forming process and that has possibly been heat-treated according to claim 19, wherein 18.0%≤Ni+Mo≤27.0%.

21. A product made of steel that has been subjected to a heat forming process according to claim 20 and that has possibly been heat-treated, wherein it has a tensile strength that is greater than or equal to 1010 MPa, a Young's modulus greater than or equal to 130 GPa, and a uniform elongation greater than or equal to 2%.

22. A product made of steel that has been subjected to a heat forming process and that has possibly been heat-treated according to claim 19, wherein Cr is present only in trace amounts resulting from the smelting and manufacturing process.

23. A product made of steel that has been subjected to a heat forming process and that has possibly been heat-treated according to claim 19, wherein traces≤Cr<0.10%.

24. A hot-rolled or cold-rolled sheet or strip according to claim 19, wherein the said sheet or strip that has been cold-rolled and possibly heat-treated has a tensile strength that is greater than or equal to 2270 MPa, a yield strength greater than or equal to 2250 MPa, and a uniform elongation greater than or equal to 2%.

25. A product made of steel, wherein it is derived from a hot-rolled or cold-rolled sheet or strip according to claim 19, possibly subjected to forming, and in that it has been possibly subjected to a surface treatment process for improving its resistance to dynamic loads.

26. A product according to claim 25, wherein the said surface treatment may be selected from among the processes of: carburising, gas nitriding, ion nitriding, carbonitriding, shot peening.

27. A turbine shaft or a transmission component part that is hot-formed, wherein the said shaft or the said component part comprises at least one element that is made from a hot-formed product according to claim 19.

28. A product made of steel that has been subjected to a heat forming process and possibly having been heat-treated according to claim 19, wherein the grain size of the product or of the sheet or strip is ASTM 8 or finer.

29. A product made of steel, wherein it is derived from a hot-rolled or cold-rolled sheet or strip according to claim 19, and subjected to forming, and in that it has been possibly subjected to a surface treatment process for improving its resistance to dynamic loads.

30. The product made of steel of claim 19 wherein:
12.0%≤Ni≤24.5%,
2.5%≤Mo≤9.0%;
0.01%≤Al≤1.0%;
traces≤S≤0.0010%.

31. A cold-rolled sheet or strip, made from steel, wherein the composition thereof, in percentages by weight is as follows:
10.0%≤Ni≤24.5%;
1.0%≤Mo≤12.0%;
1.0%≤Co≤25.0%;
22.5%≤Mo+Co+Si+Mn+Cu+W+V+Nb+Zr+Ta+Cr+ C≤29.0%;
Co+Mo≥22.0%;
Ni+Co+Mo≥41.0%;
traces≤Al≤4.0%;
traces≤Ti≤0.1%;
traces≤N≤0.0050%;
0.04%≤Si≤2.0%;
traces≤Mn≤4.0%;
traces≤C≤0.03%;
traces≤S≤0.0020%;
traces≤P≤0.005%;
traces≤B≤0.01%;
traces≤H≤0.0005%;
traces≤O≤0.0025%;
traces≤Cr≤5.0%;
traces≤Cu≤2.0%;
traces≤W≤4.0%;
traces≤Zr≤4.0%;
traces≤Ca≤0.1%;
traces≤Mg≤0.1%;
traces≤Nb≤4.0%;
traces≤V≤4.0%;
traces≤Ta≤4.0%;
with the remainder being iron and impurities resulting from the smelting and manufacturing process;
and in that the population of oxide, nitride, and sulfide inclusions, as observed by means of image analysis over a polished surface measuring 800 mm$^2$, does not contain any oxide, nitride, and sulfide inclusions having equivalent diameter greater than 10 μm.

32. A cold-rolled sheet or strip according to claim 31, wherein 18.0%≤Ni+Mo≤27.0%.

33. A cold-rolled sheet or strip according to claim 31, wherein Cr is present only in trace amounts resulting from the smelting and manufacturing process.

34. A cold-rolled sheet or strip according to claim 31, wherein traces≤Cr<0.10%.

35. A cold-rolled sheet or strip according to claim 31, wherein it has been subjected to at least one heat treatment process after cold rolling.

36. A transmission belt, wherein it comprises at least one element that is made from a cold-rolled sheet or strip or from a product of the foregoing type according to claim 31.

37. A transmission belt according to claim 36, wherein it is a CVT-type transmission belt for a motor vehicle.

38. The cold-rolled sheet or strip, made from steel, of claim 31 wherein:

12.0%≤Ni≤24.5%,
2.5%≤Mo≤9.0%;
0.01%≤Al≤1.0%;
traces≤S≤0.0010%.

\* \* \* \* \*